No. 700,987. Patented May 27, 1902.
J. S. SOUREK.
HARVESTER BELT.
(Application filed Oct. 11, 1901.)
(No Model.) 2 Sheets—Sheet 1.

Witnesses: Inventor:
Walter Bowman Joseph S. Sourek,
Maude Ginsler by Humphrey & Humphrey,
His Attorneys.

No. 700,987. Patented May 27, 1902.
J. S. SOUREK.
HARVESTER BELT.
(Application filed Oct. 11, 1901.)

(No Model.) 2 Sheets—Sheet 2.

Witnesses:
Walter Bowman
Maude Zimsler

Inventor:
Joseph S. Sourek,
By Humphrey & Humphrey,
His Attorneys.

THE NORRIS PETERS CO., PHOTO-LITHO., WASHINGTON, D. C.

UNITED STATES PATENT OFFICE.

JOSEPH S. SOUREK, OF BATH, OHIO.

HARVESTER-BELT.

SPECIFICATION forming part of Letters Patent No. 700,987, dated May 27, 1902.

Application filed October 11, 1901. Serial No. 78,315. (No model.)

*To all whom it may concern:*

Be it known that I, JOSEPH S. SOUREK, a citizen of the United States, residing at Bath, in the county of Summit and State of Ohio, have invented a certain new and useful Improvement in Harvester-Belts, of which the following is a specification.

My invention has relation to improvements in that class of belts provided to convey the grain across the platform behind the knives, as well as those which elevate the grain, thus conveyed, to the binding mechanism, and includes the rolls specially adapted to move said belts, as well as improved means of joining the ends of the belts to cause them to yield on the rollers at the joints, as well as permit them to be easily and rapidly tightened when they become slack or loose.

The object of my invention is to provide means for insuring the movement of the belts when they become dry and the rollers smooth and also means whereby the belt may be tightened any desired amount.

To the aforesaid object my invention consists in the peculiar and novel construction, arrangement, and combination of parts hereinafter described and then specifically pointed out in the claims, reference being had to the accompanying drawings, which form a part of this specification.

Figure 1:
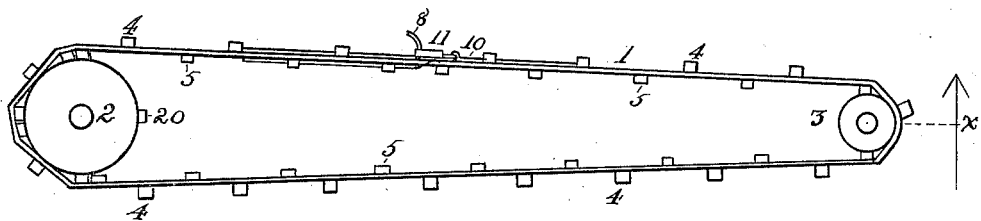
Figure 2:
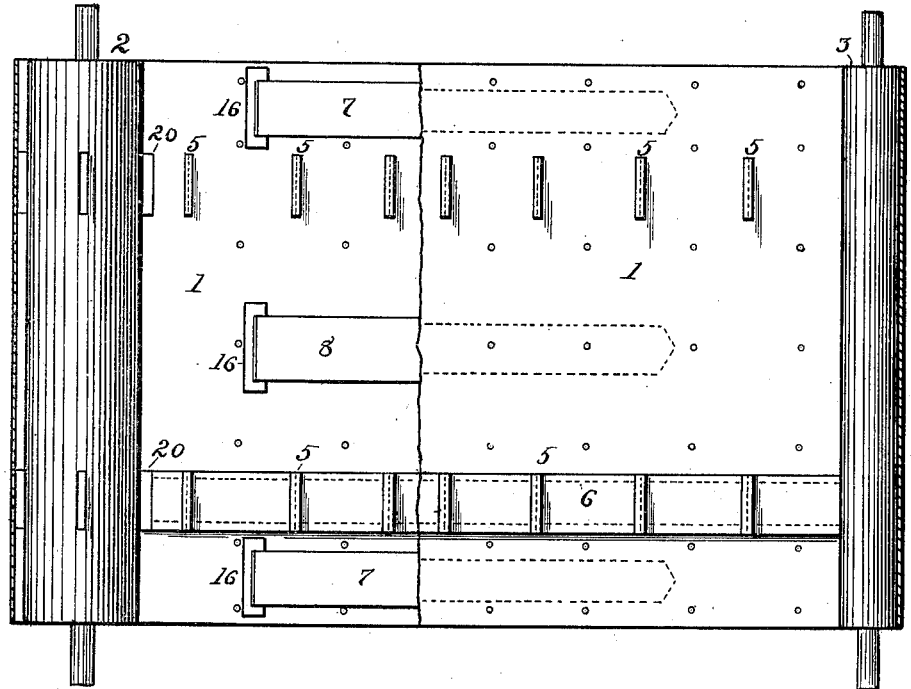
Figure 3:
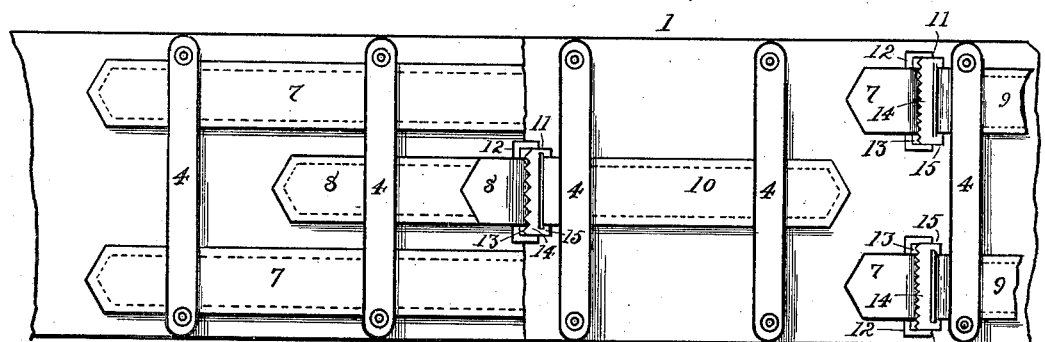
Figure 4:
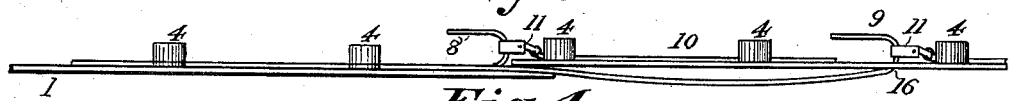
Figure 5:
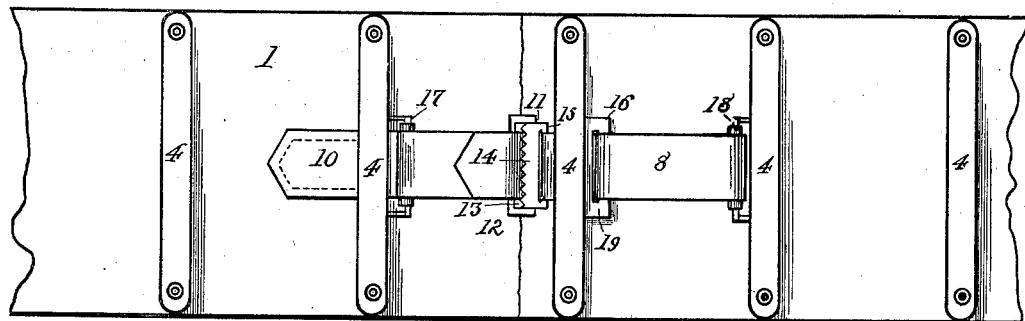
Figure 6:
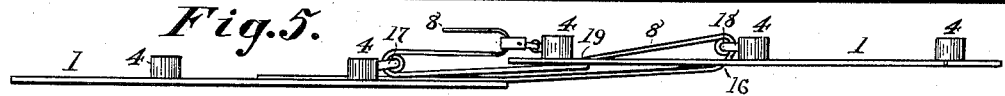

In the accompanying drawings, in which similar reference-numerals indicate like parts in the different figures, Figure 1 is an edge elevation of a harvester-belt and rollers embodying my invention; Fig. 2, a plan of the same with the belt severed at the line x of Fig. 1; Fig. 3, an enlarged view of a narrow belt, illustrating my improved method of joining the ends; Fig. 4, an edge elevation of Fig. 3; Fig. 5, a modified form of joining the belt ends; Fig. 6, an edge elevation of Fig. 5.

Referring to the figures, 1 is the ordinary wide harvester-belt that runs on the driving-roller 2 and the idler-roller 3. On the outside of the belt are the usual cross-slats 4 to engage and carry the cut grain. Thus far, excepting in the method of uniting the ends and inner slats and ridges on the roller, to be hereinafter described, the parts do not differ from the usual belts in common use.

On the inside of the belt 1 at intervals are short transverse ridges 5, that may be short strips of sole-leather or other preferred material sewed or otherwise secured directly to the belt, being in length a fraction of the width of the belt to avoid as far as may be adding any rigidity thereto, as shown in the upper row in Fig. 2, or similarly attached to a strip 6 of like material to the belt 1 and sewed thereto.

To unite the ends of the belt 1, I attach to one end thereof three straps 7 8, the outer ones, 7, preferably extending farther back from the end than the center one, 8. These straps pass under the slats 4 on the end of the belt, to which they are attached for the purpose of causing as little roughness on the belt as possible. On the opposite end of the belt are secured straps 9 10, all passing under the slats 4, the straps 9 being located farther back from the end of the belt than the strap 10. On the free end of each strap 9 10 is secured a buckle 11. The central buckle on the strap 10 is arranged to extend slightly beyond the end of the belt 1, so that it can receive the strap 8 without the latter engaging the end of the belt; but to permit the straps 7 to enter the buckles of the strap 9 there is cut in the belt 1 openings 16, properly reinforced about their edges with leather or other suitable material to prevent becoming frayed.

In uniting the ends of the belt 1 the strap end passes slightly under the buckle end, as shown in Figs. 2, 3, and 4, thus preventing an opening through which straw and grain may fall to impede or clog the rollers. This uniting is done by securing the strap 8 in the buckle on the strap 10 and passing the straps 7 under the buckle end of the belt 1 up through the openings 16 into the buckles on the straps 9.

In securing the belt ends the buckles may all be placed in the position of the buckle-strap 10—that is, even with the end of the belt. This is illustrated in Figs. 5 and 6, where a single strap is shown, it being deemed unnecessary to add side straps, as they would be merely duplicates of the one shown. In this case I attach to the slat 4 on the strap end of the belt and the slat 4 on the buckle end of the belt immediately back of the openings 16 hasps 17 18, respectively, provided with rollers to permit the free movement of the straps 9 10 and make openings 19, similar to the openings 16, back of the slat 4 nearest the buckles. I then pass the straps under the buckle end of the belt, up through the opening 16, around the rollers of the hasps 17 on the adjacent slat 4, then back on top of the belt and down through the openings 19, around the rollers on the hasps 17 on the strap ends of the belt, and back into the buckle 11. By this arrangement and construction I prevent any opening between the ends of the belt through which straw or grain may escape, and the buckle permits of delicate adjustment to secure desired tension.

To insure motion in the belt and prevent slipping on the rollers, I place short corrugations 20 on the periphery of the driving-roller 2 to engage the ridges 5 on the inside of the belt. These corrugations will be placed in position to engage the ridges 5, and there should be as many ranks of them as there are rows of said ridges, and they should be shorter than said ridges, so as to avoid as far as possible rendering the face of the canvas belt uneven, and may be of any preferred form and may be arranged to sink into the roller and be forced out by springs; but a simple and convenient form will be short strips of leather or like material tacked or otherwise secured to the outside of the roller.

Having thus described my invention, what I claim, and desire to secure by Letters Patent, is—

1. An improved conveyer-belt for harvesters having external cross-slats to convey the cut grain and ranks of short transverse ridges less in length than the width of said belt on the inside to engage corrugations on the driving-roller, substantially as shown and described.

2. The combination with a conveyer-belt for harvesters having external cross-slats and ranks of short transverse ridges less in length than the width of said belt on the inside, of a driving-roller having lines of short corrugations to engage said ridges, substantially as shown and described.

3. An improved conveyer-belt having joining-straps on one end situated back from the end, and buckles on the other end, one whereof is at the end of the belt and the others back therefrom, with openings in said belt adjacent to said latter buckles to permit said straps to pass through from the inside to the buckles, substantially as shown and described.

In testimony that I claim the above I hereunto set my hand in the presence of two subscribing witnesses.

JOSEPH S. SOUREK.

In presence of—
C. E. HUMPHREY,
C. P. HUMPHREY.